(No Model.)
G. W. COFFEE.
STEAM TRAP.
No. 268,081. Patented Nov. 28, 1882.
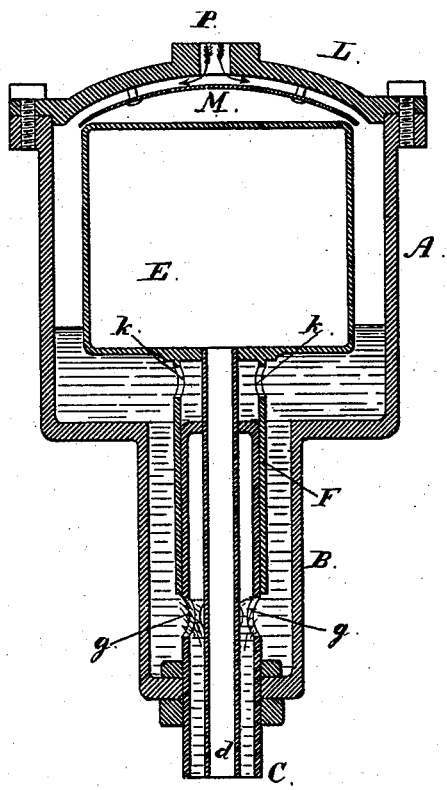
Witnesses:
Inventor:
George W Coffee
By his Attys.,

UNITED STATES PATENT OFFICE.

GEORGE W. COFFEE, OF SAN FRANCISCO, CALIFORNIA.

STEAM-TRAP.

SPECIFICATION forming part of Letters Patent No. 268,081, dated November 28, 1882.

Application filed August 12, 1881. (No model.)

*To all whom it may concern:*

Be it known that I, GEORGE W. COFFEE, of the city and county of San Francisco, in the State of California, have invented an Improved Steam-Trap; and I do hereby declare that the following is a full, clear, and exact description thereof, reference being had to the accompanying drawing.

My invention relates to that class of steam-traps in which a telescopic or sliding tube is operated by a float to cover and uncover the opening through which the water of condensation is discharged from the trap.

The invention will be understood as hereinafter set forth and claimed.

Referring to the accompanying drawing, which is a vertical section of my improved trap, let A represent the shell of the main chamber of the trap, and E the closed hollow float that moves in it.

L is the cover of the trap.

The shell A, I construct with an extension-chamber, B, on its under side. This latter chamber is smaller in diameter than the main chamber, so as to form a well or reservoir underneath the main chamber for the water of condensation to collect in.

C is the discharge pipe or tube, which passes up through the bottom of the well or lower chamber, B, so that its upper end is level with the bottom of the main chamber and directly underneath the center of the float E. This discharge-pipe I make large enough in diameter to allow the drain-tube $d$ of the float to pass down through its center, and yet leave space enough around the drain-tube for the water to pass through. For this purpose I close the upper end of the pipe C and make a hole through the center of its top, which is just large enough for the drain-tube to move through. The drain-tube $d$ is attached to the bottom of the float E at its center, and its passage is connected with the interior of the closed hollow float E, so that it will drain the interior of the float and keep it clear of water, and thus insure its flotation. This drain-tube moves up and down with the float and assists in guiding it as it moves.

F is the telescopic tube, which is attached to the bottom of the float and extends down on the outside of the discharge-pipe C. The openings $g$, through which the water of condensation is discharged from the reservoir, are made near the bottom of the reservoir or chamber B, and the telescopic tube F extends down so as to cover them when the float is resting on the bottom of the main chamber. If the telescopic tube F remained intact, its large size would take off a considerable pressure from the under side of the float, so that the buoyancy of the float would be destroyed. To remedy this I make one or more openings, K, in the upper end of the telescopic pipe, near the float, so that the steam can enter between it and the drain-pipe. The only area not exposed to the steam-pressure will then be that occupied by the drain-pipe, and this will not materially interfere with the buoyancy of the float.

I connect the steam-pipe with connection P, in the top of the trap directly above the float, and I arrange a shield or deflector, M, above the float, so that the steam will strike the deflector and be conducted to the space around the sides of the float before it enters the chamber, thus preventing the direct impact of the steam upon the float. Now, as the water accumulates in the trap it will collect in the reservoir or well B until the well is filled, and as it begins to rise in the main chamber it will raise the float until the telescopic tube uncovers the discharge-openings, so as to commence discharging the water. By this arrangement the water is discharged from the bottom of the reservoir, so that it is impossible for any steam to escape, and the level of the water cannot descend below the bottom of the main chamber.

This trap has succeeded in keeping steam-pipes clear from the water of condensation where all other traps have failed, and I have used them with more than ordinary benefit and success in the sugar-refineries in the Sandwich Islands, even where other float-traps have failed and been discarded. The closed hollow float, with its drain-pipe, seems to render the machine exceedingly sensitive, so that the water is kept at a uniform level in the trap and all surplus is discharged.

Having thus described my invention, what I claim, and desire to secure by Letters Patent, is—

1. In an upright steam-trap having the body A B and an upright fixed pipe, C, closed at the top, and having the openings $g$ near the base of the portion B, the combination, with said parts, of the float E, having the discharge-pipe d, moving inside the fixed pipe C, and the telescopic pipe F, moving over the exterior of the fixed pipe C, as set forth.

2. In a steam-trap, the float E, provided with the drain-pipe d, arranged to move through the center of the discharge-pipe C, and the telescopic tube F, arranged to move on the outside of the discharge-pipe, so as to cover and uncover the discharge-openings, said telescopic tube having one or more openings, K, for admitting steam between the telescopic tube and drain-pipe, substantially as described.

In witness whereof I have hereunto set my hand and seal.

GEORGE W. COFFEE. [L. S.]

Attest:
W. F. CLARK,
WM. VOIT.